US008290917B2

(12) United States Patent
Ostrovsky et al.

(10) Patent No.: US 8,290,917 B2
(45) Date of Patent: Oct. 16, 2012

(54) REORDERING OF DATA ELEMENTS IN A DATA PARALLEL SYSTEM

(75) Inventors: Igor Ostrovsky, Bellevue, WA (US); John Duffy, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 489 days.

(21) Appl. No.: 12/131,761

(22) Filed: Jun. 2, 2008

(65) Prior Publication Data

US 2009/0299958 A1 Dec. 3, 2009

(51) Int. Cl.
*G06F 17/30* (2006.01)

(52) U.S. Cl. . 707/696; 707/741; 707/715; 707/E17.002; 707/E17.017; 707/E17.053

(58) Field of Classification Search ........... 707/999.002, 707/E17.017, 696, 741, 803, 713, 715, 999.003, 707/999.005, 999.006, E17.002, E17.053
See application file for complete search history.

(56) References Cited

U.S. PATENT DOCUMENTS

| | | | |
|---|---|---|---|
| 5,551,027 A * | 8/1996 | Choy et al. ............................ | 1/1 |
| 5,757,297 A | 5/1998 | Ferraiolo et al. | |
| 5,806,059 A * | 9/1998 | Tsuchida et al. ...................... | 1/1 |
| 5,819,021 A | 10/1998 | Stanfill et al. | |
| 5,884,320 A | 3/1999 | Agrawal et al. | |
| 5,909,681 A | 6/1999 | Passera et al. | |
| 5,991,785 A | 11/1999 | Alidina et al. | |
| 6,003,036 A | 12/1999 | Martin | |
| 6,289,334 B1 * | 9/2001 | Reiner et al. ........................ | 1/1 |
| 6,289,474 B1 | 9/2001 | Beckerle | |
| 6,438,562 B1 * | 8/2002 | Gupta et al. .................. | 707/696 |
| 6,687,798 B1 | 2/2004 | Thusoo et al. | |
| 6,691,166 B1 | 2/2004 | Gasior et al. | |
| 6,850,947 B1 | 2/2005 | Chung et al. | |
| 2004/0122845 A1 | 6/2004 | Lohman et al. | |
| 2004/0148293 A1 * | 7/2004 | Croisettier et al. ........... | 707/100 |
| 2006/0218123 A1 * | 9/2006 | Chowdhuri et al. .............. | 707/2 |

OTHER PUBLICATIONS

Duffy, et al., "Running Queries on Multi-Core Processors", http://msdn.microsoft.com/msdnmag/issues/07/10/PLINQ/default.aspx.
Ludwig Thomas, "Research Trends in High Performance Parallel Input/Output for Cluster Environments", Proceedings of the 4th International Scientific and Practical Conference on Programming, UkrPROG'2004, Date: 2004, pp. 13.
Isaila, et al., "Clusterfile: A Flexible Physical Layout Parallel File System", 3rd IEEE International Conference on Cluster Computing (CLUSTER'01), Date: 2001, pp. 37-44.
Isaila et al., "Mapping Functions and Data Redistribution for Parallel Files", Parallel and Distributed Processing Symposium., Proceedings International, IPDPS 2002, Abstracts and CD-ROM, Date: 2002, pp. 237-244.

* cited by examiner

*Primary Examiner* — Fred I Ehichioya
*Assistant Examiner* — Shiow-Jy Fan

(57) ABSTRACT

A query that identifies an input data source is received. The input data source is partitioned into a plurality of partitions. Each of the partitions includes a set of data elements with an associated set of indices for indicating an ordering of the data elements. A query type for a query operator in the received query is identified. It is determined whether a reordering of data elements will be performed based on the identified query type. The data elements in at least one of the partitions are reordered when it is determined based on the identified query type that reordering will be performed.

7 Claims, 4 Drawing Sheets

REORDERING OF DATA ELEMENTS IN A DATA PARALLEL SYSTEM

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that the same logical operation can utilize many processors at one time to thereby deliver better performance as more processors are added to the computers on which such software runs.

When parallelizing previously-written sequential algorithms, it is often desirable to keep as much of the previous sequential program behavior as possible. However, typical parallel execution of existing sequential logic introduces new behavioral characteristics and presents problems that can introduce challenges into the migration from sequential to parallel algorithms.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Data parallel systems typically operate by partitioning input data into disjoint subsets (partitions) so that independent tasks of execution may process the separate subsets in isolation. The partitions are typically processed in parallel by multiple tasks of execution to generate a plurality of output sets. The output sets are then typically merged back into a merged output set.

In one embodiment, a query that identifies an input data source is received. The input data source is partitioned into a plurality of partitions. Each of the partitions includes a set of data elements with an associated set of indices for indicating an ordering of the data elements. A query type for a query operator in the received query is identified. It is determined whether a reordering of data elements will be performed based on the identified query type. The data elements in at least one of the partitions are reordered when it is determined based on the identified query type that reordering will be performed.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

Figure 1:
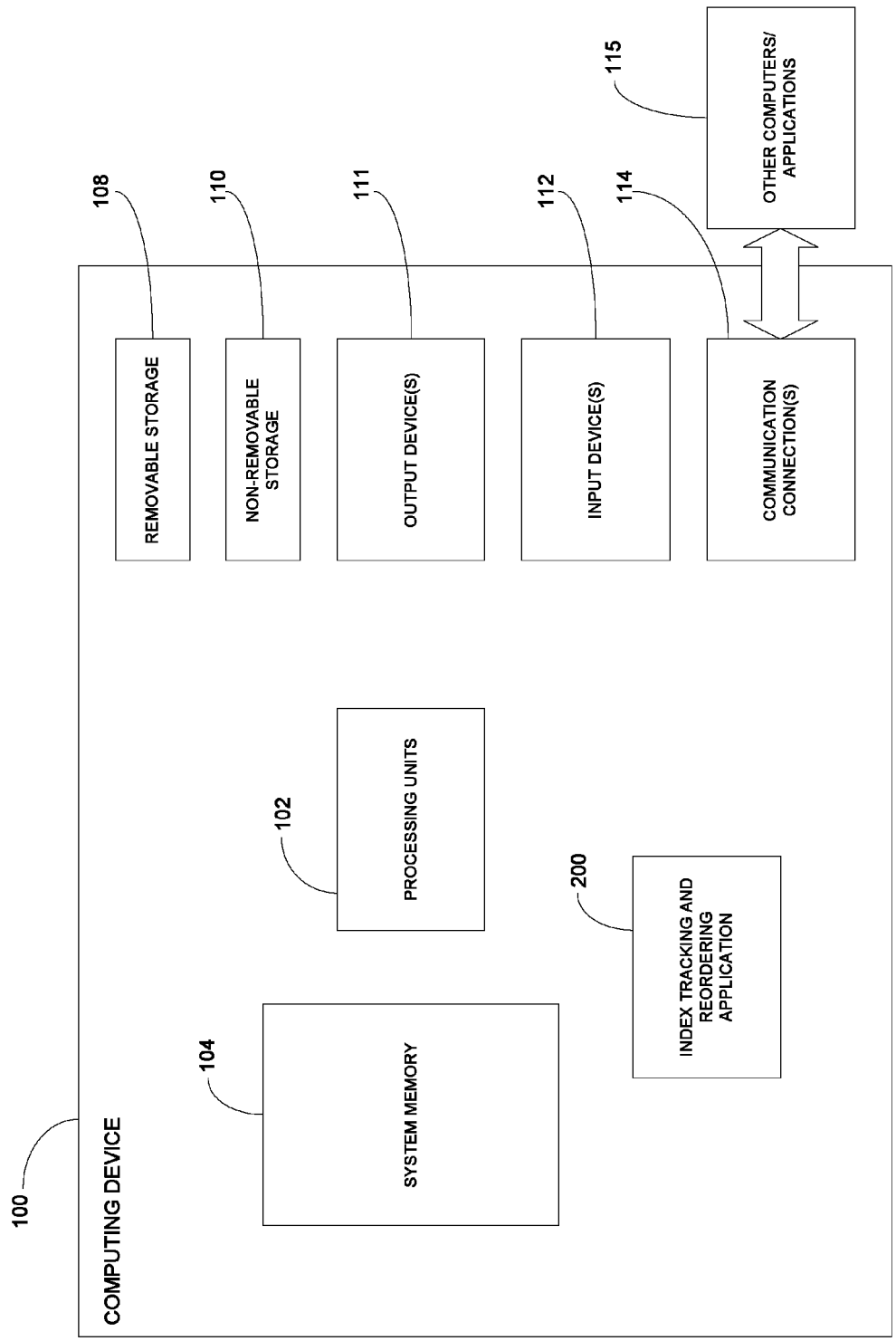
FIG. 1 is a diagram illustrating a computing system suitable for performing index tracking and reordering according to one embodiment.

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides an application that performs index tracking and reordering for data parallel operations, but the technologies and techniques described herein also serve other purposes in addition to these. In one implementation, one or more of the techniques described herein can be implemented as features within a framework program such as MICROSOFT® .NET Framework, or within any other type of program or service that handles data parallel operations in programs.

Data parallel systems typically operate by partitioning input data into disjoint subsets (partitions) so that independent tasks of execution may process the separate subsets in isolation. The partitions are processed in parallel by multiple processors to generate a plurality of output sets (e.g., the query is executed in parallel using the plurality of partitions). The output sets are merged back into a merged output set, or processed independently.

Some data parallel systems provide an application programming interface (API) that allows a programmer to express an operation on an input sequence as a chain of query operators such as filters, projections, aggregations, as well as other operators. The declarative nature of the query allows the API implementation to take advantage of multiple processors when executing the query.

The following are some examples of query operators according to one embodiment.

(1) ALL—evaluates a predicate function on each element in the input and returns true only if the predicate returned true for every single element. If any element yields false, a false is returned, which can happen at the first occurrence of a false predicate return value.

(2) ANY—evaluates a predicate function on the input and returns true if the predicate returns true on any one element, and returns false if the predicate yields false for every element in the input.

(3) CONTAINS—searches the input for a particular value, returning true if the value was found at least once and false otherwise.

(4) FIRST—returns the first element from the input for which a predicate returns true. Note that if the predicate matches multiple elements, only the first one, based on ordinal position, is returned.

(5) LAST—returns the last element from the input for which a predicate returns true. Note that if the predicate matches multiple elements, only the last one is returned.

(6) TAKEWHILE—outputs all elements in the input leading up to the first element for which a specified predicate returns false.

(7) SKIPWHILE—outputs all elements in the input that occur after the first occurrence of an element for which a specified predicate returns false.

(8) TAKE(N)—outputs the first N elements of the input.

(9) SKIP(N)—outputs the input sequence excluding the first N elements.

(10) INDEXED SELECT—a projection operator that allows the value of the projection function to depend on positions of elements in the input sequence (for example, an indexed select could negate integers that are in even positions in the input sequence, and preserve the elements in the odd positions).

(11) INDEXED WHERE—filter that allows the filtering predicate to depend on positions of elements in the input sequence (for example, the filter could only keep the elements in even positions).

(12) SELECT—used to perform a projection on a data collection to select either all the data members that make up the object or a subset of it.

(13) REVERSE—reverses a data collection.

(14) UNION—performs a union operation on two input sequences.

During the partitioning of an input sequence in a data parallel system, a situation may occur where the input sequence is partitioned non-contiguously, due to various practical concerns. For example, in an on-demand partitioning scheme, parts of the input may be dynamically assigned to partitions, in order to achieve load balancing if different elements of the input sequence involve different amounts of work. Since ordering of partitions does not directly correspond to ordering of the elements in the input, information about how different elements from different partitions were originally ordered against each other becomes lost unless it is explicitly tracked in some way.

For example, consider the input sequence (7,1,2,4,3,6), and a data-parallel filter operation that only keeps odd integers. Assume that the data parallel implementation splits the input into two partitions, (7,2,3) and (1,4,6). After applying the filter, the two output sets will be (7,3) and (1). However, unless the information is remembered that the "1" was positioned between the "7" and the "3" in the original input, the filtered results will not be presented to the user in the order in which they appeared in the input.

One embodiment provides a data parallel system and method that assigns ordinal order indices to the elements of an input sequence at the time that the sequence is to be partitioned, maintains and tracks the indices during parallel execution of the query, and uses the indices to produce a correctly ordered output sequence. For some query operators, if the operator is not provided ordered input, the output generated by the operator may not be correct. One embodiment addresses this issue by assigning ordinal indices to elements in the input sequence, tracking the state of the indices as various operators process the sequence, and performing work (e.g., reordering) to correct the state of the indices if the indices are not in an appropriate state for a query operator that is about to process the sequence. One embodiment provides order preservation throughout the query execution process. For order preservation to work correctly, the indices are "remembered" for as long as the system runs in parallel. This allows many disparate partitions to be brought back into one correctly ordered stream during the merge.

FIG. 1 is a diagram illustrating a computing device 100 suitable for performing index tracking and reordering according to one embodiment. In the illustrated embodiment, the computing system or computing device 100 includes a plurality of processing units (i.e., processors or threads) 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes index tracking and reordering application 200. Index tracking and reordering application 200 is described in further detail below with reference to FIG. 2.

Figure 2:
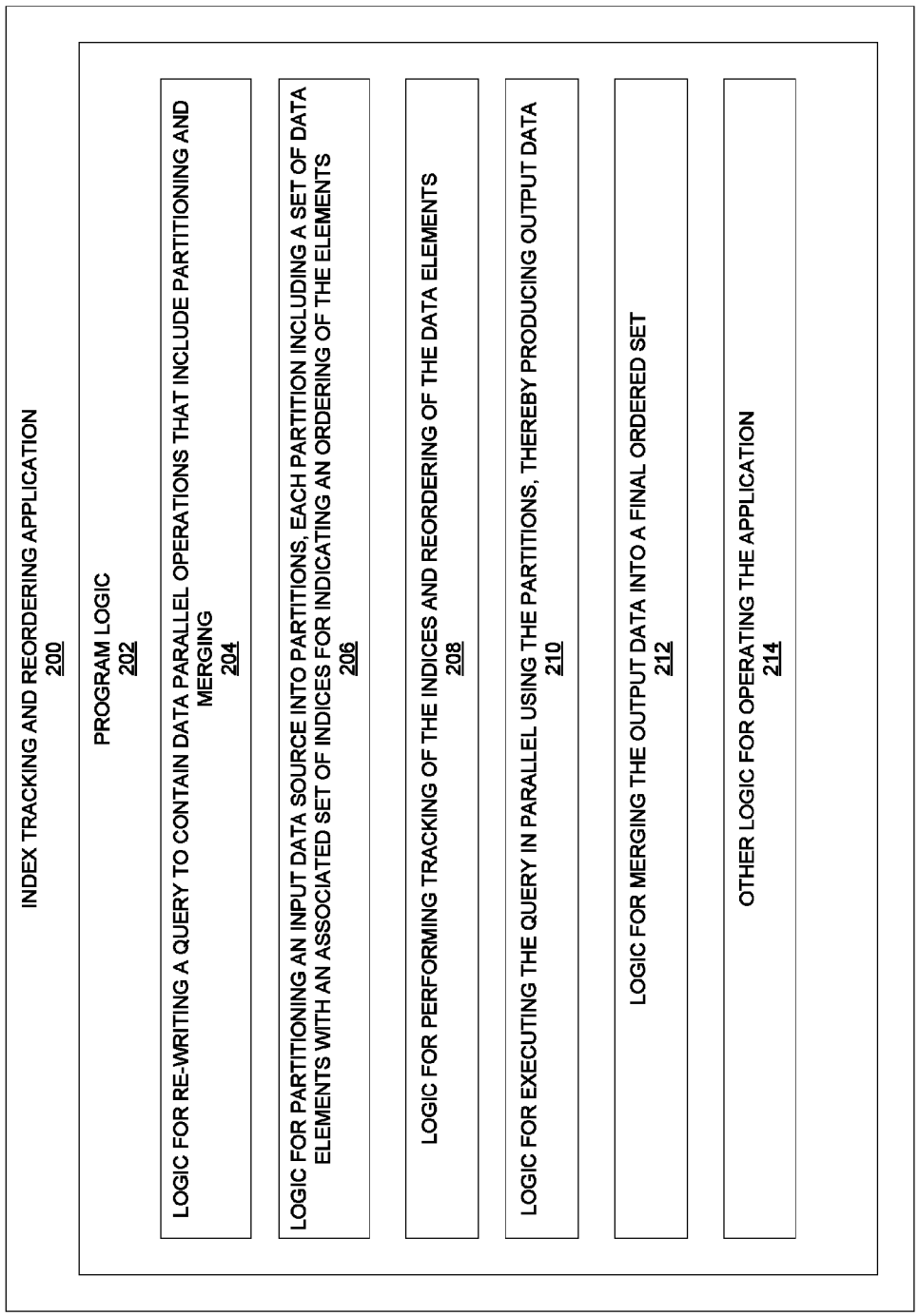
FIG. 2 is a diagrammatic view of an index tracking and reordering application for operation on the computer system illustrated in FIG. 1 according to one embodiment.

FIG. 2 is a diagrammatic view of one embodiment of an index tracking and reordering application 200 for operation on the computing device 100 illustrated in FIG. 1. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Index tracking and reordering application 200 includes program logic 202, which is responsible for carrying out some or all of the techniques described herein. Program logic 202 includes logic 204 for re-writing a query to contain data parallel operations that include partitioning and merging; logic 206 for partitioning an input data source into partitions, with each partition including a set of data elements with an associated set of indices for indicating an ordering of the elements; logic 208 for performing tracking of the indices and reordering of the data elements; logic 210 for executing the query in parallel using the partitions, thereby producing output data; logic 212 for merging the output data into a final ordered set; and other logic 214 for operating the application.

The term "query" as used herein is not limited to any one specific type of data parallel operation, but rather is applicable to all types of data parallel operations. A "query" according to one embodiment includes, for example, any type of expression, program, statement, or computation, used in data parallel operations.

Figure 3:
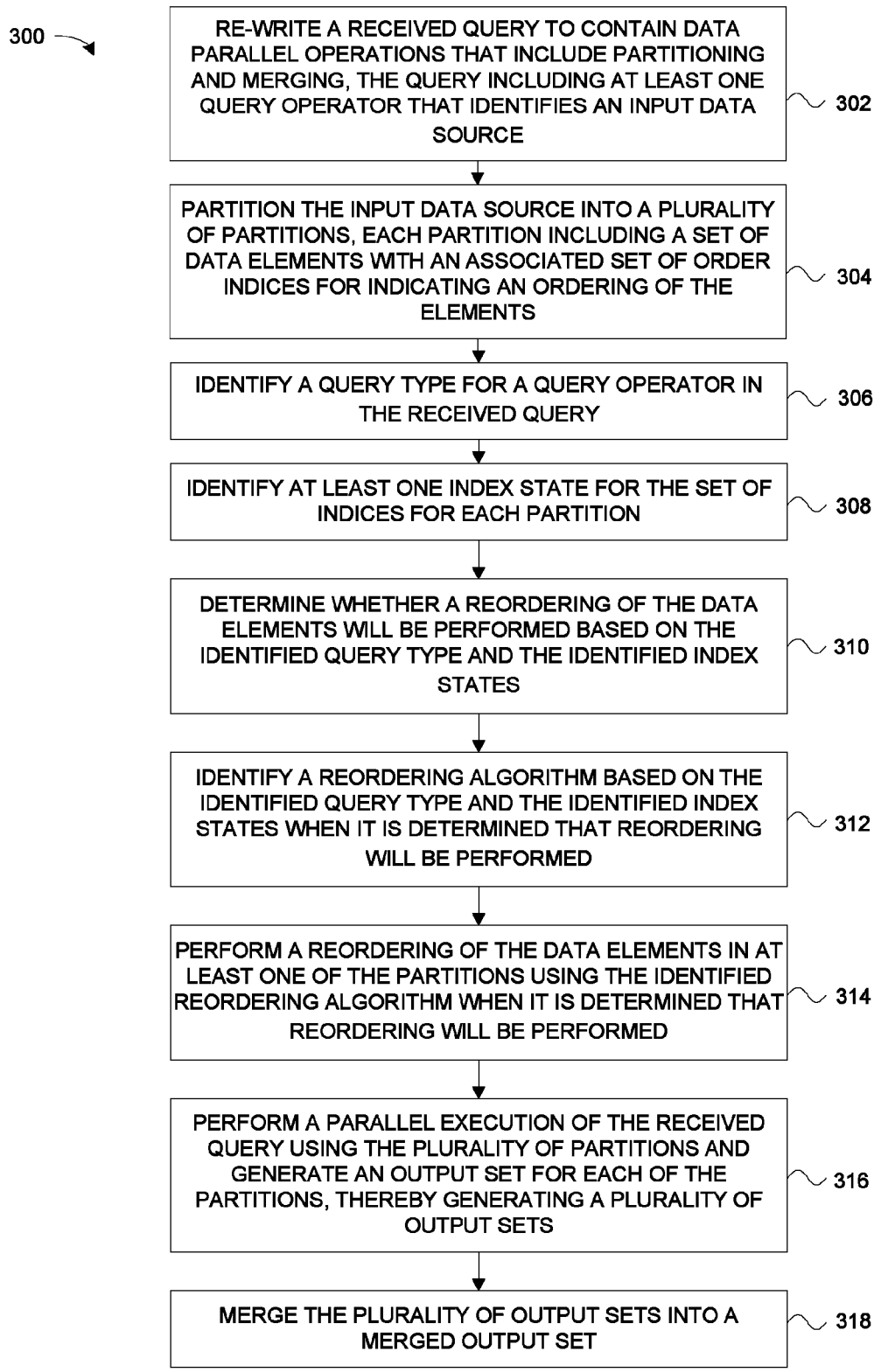
FIG. 3 is a flow diagram illustrating a method for executing a query in a parallel manner according to one embodiment.
Figure 4:
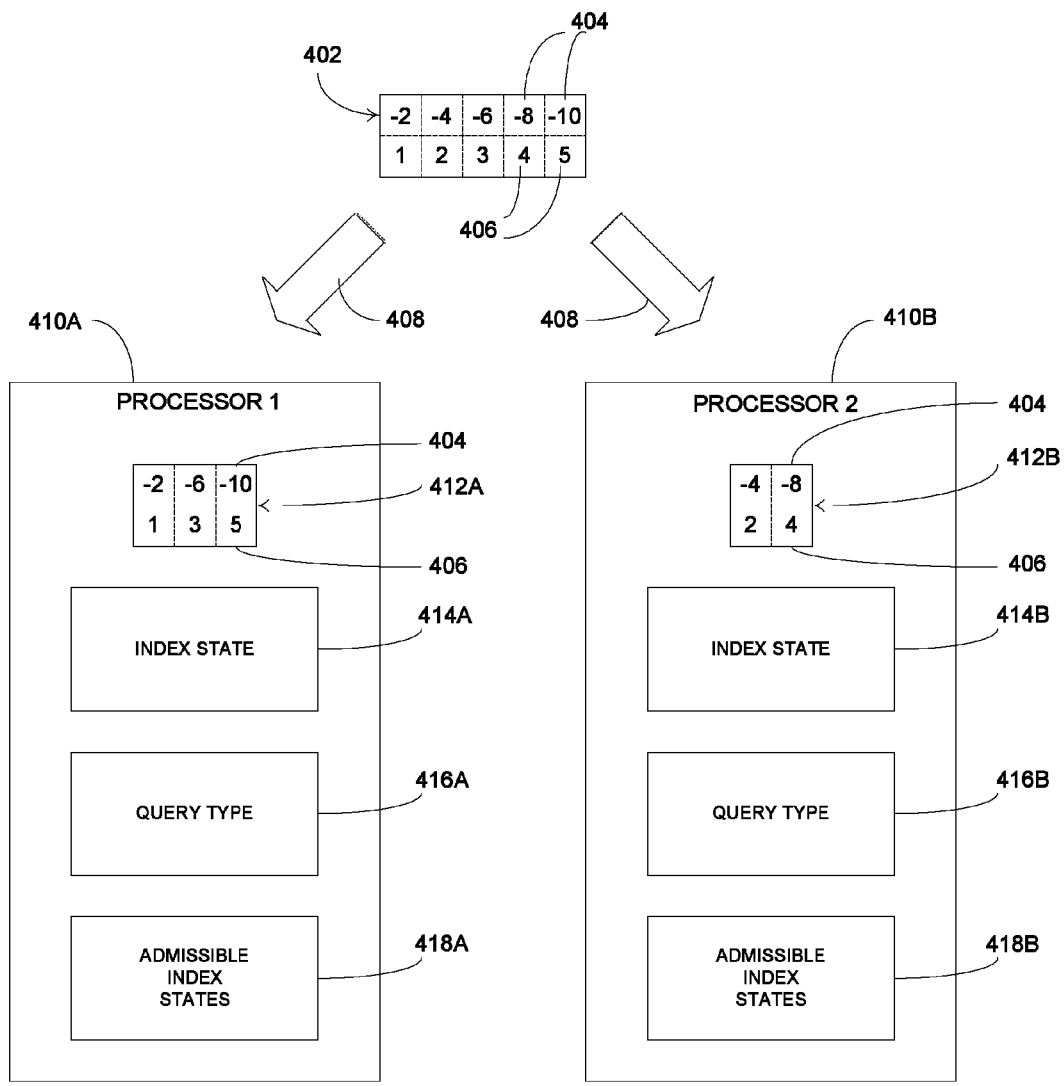
FIG. 4 is a diagram illustrating the partitioning of input data and the tracking of index state information according to one embodiment.

Turning now to FIGS. 3 and 4 with continued reference to FIGS. 1 and 2, methods for implementing one or more embodiments of index tracking and reordering application 200 are described in further detail. In some implementations, the methods illustrated in FIGS. 3 and 4 are at least partially implemented in the operating logic of computing device 100.

FIG. 3 is a flow diagram illustrating a method 300 for executing a query in a parallel manner according to one embodiment. At 302, a query is received and is re-written to contain data parallel operations that include partitioning and merging, the query including at least one query operator that identifies an input data source. At 304, a partition operation partitions the data source into a plurality of disjoint partitions, with each partition including a set of data elements with an associated set of order indices for indicating an ordering of the data elements. At 306, a query type for a query operator in the received query is identified.

At 308, at least one index state for the set of indices for each partition is identified. In one embodiment, a plurality of index states for the set of indices for each partition is identified at 308. In one embodiment, the plurality of index states for each partition includes a first state indicating whether the set of indices for the partition is normalized, a second state indicating whether the set of indices for the partition is ordered, and a third state indicating whether the set of indices for the partition is contiguously partitioned. These index states are described in further detail below with respect to FIG. 4. In another embodiment, other index states may be used, such as a first state indicating whether the set of indices is correct (e.g., within each partition, elements are correct (i.e., normalized)); a second state indicating whether the set of indices is increasing (e.g., within each partition, elements are at least increasing); and a third state indicating whether the set of indices is invalid. Each index state is successively weaker in this embodiment.

At 310, it is determined whether a reordering of the data elements will be performed based on the query type identified at 306 and the index states identified at 308. In one embodiment, the determination at 310 is made at least in part by comparing the at least one index state identified at 308 to a set of admissible index states, which are identified based on the query type identified at 306. At 312, a reordering algorithm is identified based on the query type identified at 306 and the index states identified at 308 when it is determined at 310 that reordering will be performed. At 314, a reordering operation performs a reordering of the data elements in at least one of the partitions using the reordering algorithm identified at 312 when it is determined at 310 that reordering will be performed.

For example, in one embodiment, it may be determined at 310 that a reordering of the data elements in a first one of the partitions will be performed when the admissible index states indicate that the data elements for the received query operator are to be ordered and the at least one index state indicates that the set of data elements in the first partition are non-ordered. In one form of this embodiment, a reordering of the data elements in the first partition will be performed to cause the data elements to be ordered.

At 316, a plurality of parallel workers (e.g., processors or threads) performs a parallel execution of the received query using the plurality of partitions and generates and output set for each of the partitions, thereby generating a plurality of output sets. At 318, a merge operation merges the plurality of output sets into a merged output set. In one embodiment, the order indices are used at 318 to help ensure that the elements in the merged output set will be in the correct order.

FIG. 4 is a diagram illustrating the partitioning of input data and the tracking of index state information according to one embodiment. As shown in FIG. 4, an input data sequence 402 includes a set of data elements 404 and an associated set of order indices 406 for indicating an ordering of the data elements 404. Each data element 404 has a corresponding index 406. In the illustrated embodiment, the data element values −2, −4, −6, −8, and −10 correspond to or are associated with ordinal index values 1, 2, 3, 4, and 5, respectively. The input data sequence 402 is partitioned, as indicated by arrows 408, into two partitions 412A and 412B, which are provided to processors 410A and 410B, respectively. The partitions 412A and 412B each include a set of data elements 404 and an associated set of indices 406 from the input data sequence 402.

In one embodiment, processors 410A and 410B are configured to perform a parallel execution of a query, which includes one or more query operators, using the partitions 412A and 412B, respectively. In one embodiment, processors 410A and 410B are also configured to generate index state information 414A and 414B, respectively, and query type information 416A and 416B, respectively.

In one embodiment, index state information 414A and 414B each include three index state parameters for each ordinal index 406, with each index state parameter having one of two possible index states. The index states according to one embodiment are: Normalized or non-normalized (i.e., relative); ordered or non-ordered (i.e., shuffled); and contiguously partitioned or non-contiguously partitioned.

For the normalized index state according to one embodiment, the ordinal indices 406 correctly specify the O-based index of each element 404 in the output. For example, if the input data sequence (7,1,2,4,3,6) is partitioned into the two partitions ((7,2,3), (1,4,6)), one example of indices in a normalized index state would be ((0,2,4), (1,3,5)). For the non-normalized (or relative) index state according to one embodiment, sorting data elements 404 according to their indices 406 would produce the correct output, but the indices 406 do not correctly specify O-based indices of elements in the output. For example, if the input data sequence (7,1,2,4,3,6) is partitioned into the two partitions ((7,2,3), (1,4,6)), one example of indices in a non-normalized index state would be ((0,11, 17), (5,14,20)).

The ordered or non-ordered index states indicate whether the elements 404 in each partition 412A and 412B are ordered according to the indices 406. For the ordered index state according to one embodiment, within each partition, elements 404 are sorted or ordered according to the indices 406. One example of indices in an ordered index state would be ((0,2,4), (1,3,5)). For the non-ordered (or shuffled) index state according to one embodiment, within each partition 412A and 412B, elements 404 are not sorted according to the indices 406. One example of indices in a non-ordered index state would be ((2,4,0), (1,5,3)).

The contiguously partitioned or non-contiguously partitioned index states indicate whether the elements 404 in an input partition 412A or 412B are contiguously partitioned. For the contiguously partitioned index state according to one embodiment, the indices 406 do not specify two elements 404 from the same partition (e.g., partition 412A) that surround an element 404 from another partition (e.g., partition 412B) in the ordered output. One example of indices in a contiguously partitioned index state would be ((0,1,2), (3,4,5)). For the non-contiguously partitioned index state according to one embodiment, the indices 406 may specify two elements 404 from the same partition (e.g., partition 412A) that surround an element 404 from another partition (e.g., partition 412B) in the ordered output. One example of indices in a non-contiguously partitioned index state would be ((0,2,4), (1,3,5)).

In one embodiment, query operators are each categorized into one of a plurality of categories or query types based on the index states of the input data that are appropriate or admissible for the query operator. For each query operator that is to be executed, the processors 410A and 410B determine query type information 416A and 416B, respectively, for that query operator. In one embodiment, the index state information 414A and 414B, and the query type information 416A and 416B, is used by the processors 410A and 410B, respectively, to eliminate or reduce the cost of index correction (e.g., deciding whether an index-corrective action should be performed, and choosing the least costly algorithm to perform index corrections).

In one embodiment, for each query operator, admissible index state information 418A and 418B is provided to the processors 410A and 410B, respectively, for that query operator. The admissible index state information 418A and 418B for a query operator defines what index states are admissible in order for the operator to function correctly and produce correct output data. For example, a WHERE query operator with an index-dependent predicate should know the exact position of each element 404 in the sequence in order to decide whether the element 404 passes the filter or not, so the indices 406 should be normalized, but do not have to be ordered. A WHERE query operator with an index-independent predicate does not depend on element ordering, so the indices 406 can be in any index state. A TAKE operator can function with indices 406 in any index state, but it can be implemented more efficiently with indices 406 in an ordered or normalized index state, and even more efficiently when the indices 406 are both ordered and normalized.

In one embodiment, processors 410A and 410B are each configured to track how the execution of each query operator changes the index state of the indices 406, and update the index state information 414A and 414B accordingly. For example, a SELECT query operator will not degrade the index state. A WHERE query operator will degrade a normalized index state to a non-normalized index state (note that the indices will remain ordered if they were ordered at the input to WHERE, but there may be missing indices). A REVERSE query operator will degrade an ordered index state to a non-ordered index state. A SORT query operator may degrade the index state to non-normalized, non-ordered, and non-contiguously partitioned in implementations where the sort is deferred until the merge phase. Other embodiments may eagerly sort, which would yield immediately correct, normalized indices.

In one embodiment, when there is a mismatch between the admissible index states (indicated by information 418A and 418B) of a query operator that is about to be executed, and the actual index state of the indices 406 (indicated by information 414A and 414B), actions to correct the mismatch are performed by one or more of processors 410A and 410B. In one embodiment, if the indices 406 are non-normalized, non-ordered, and non-contiguously partitioned, all of the indices 406 are fully sorted or reordered in order to correct the mismatch. However, if the indices 406 are ordered, the elements 404 within each partition 412A and 412B are already sorted, so a more efficient merge is performed for this case in one embodiment. If the indices 406 are ordered and contiguously-partitioned, then the indices 406 within one or more of the partitions 412A and 412B are sorted in one embodiment, instead of doing a complete sorting of all of the indices 406.

In one embodiment, cases where the sequence order is undefined, for example because it was produced by an operator with an undefined output order (e.g., produced by a UNION operator), are handled by the rest of the query as a special case where indices are absent and any output order is admissible. In another embodiment, indices are assigned greedily to elements starting from zero and incrementing, and the indices are treated as normalized and ordered by the rest of the query.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer storage medium storing computer-executable instructions for performing a method comprising:
   receiving a query that identifies an input data source;
   partitioning the input data source into a plurality of partitions, each of the partitions including a set of data elements with an associated set of indices for indicating an ordering of the data elements;
   identifying a plurality of index states for the set of indices for each partition, wherein the plurality of index states for each partition include a first state indicating whether the set of indices for the partition is normalized, a second state indicating whether the set of indices for the partition is ordered, and a third state indicating whether the set of indices for the partition is contiguously partitioned;
   identifying a query type for a query operator in the received query;
   identifying a set of admissible index states for the query operator based on the identified query type;
   comparing the identified plurality of index states to the set of admissible index states;
   determining prior to execution of the query whether a reordering of data elements will be performed based on the identified query type and the comparison of the identified plurality of index states to the set of admissible index states; and
   reordering the data elements in at least one of the partitions prior to execution of the query when it is determined based on the identified query type and the comparison that reordering will be performed.

2. The computer storage medium of claim 1, wherein the method further comprises:
   performing a parallel execution of the query using the plurality of partitions.

3. The computer storage medium of claim 1, wherein the method further comprises:
   identifying a reordering algorithm based on the identified query type and the identified index states; and
   performing the reordering of the data elements using the identified reordering algorithm.

4. The computer storage medium of claim 1, wherein the method further comprises:

generating an output set for each of the partitions, thereby generating a plurality of output sets; and merging the plurality of output sets into a merged output set.

5. A method for performing a parallel execution of a query, the method comprising:

receiving a query operator that identifies an input data source;

partitioning the input data source into a plurality of partitions, each of the partitions including a set of data elements with an associated set of indices for indicating an ordering of the data elements;

identifying a plurality of index states for the set of indices for each partition, wherein the plurality of index states for each partition includes a first state indicating whether the set of indices for the partition is normalized, a second state indicating whether the set of indices for the partition is ordered, and a third state indicating whether the set of indices for the partition is contiguously partitioned;

identifying a query type for the query operator;

identifying a set of admissible index states for the query operator based on the identified query type;

comparing the identified plurality of index states to the set of admissible index states;

determining prior to execution of the query whether a reordering of data elements will be performed based on the identified query type and the comparison of the identified plurality of index states to the set of admissible index states;

reordering the data elements in at least one of the partitions prior to execution of the query based on the identified query type and the identified plurality of index states; and executing the query in a parallel manner using the plurality of partitions, wherein the receiving, partitioning, identifying at least one index state, identifying a query type, identifying a set of admissible index states, comparing, determining, reordering, and executing are performed by at least one processor.

6. The method of claim 5, and further comprising:

identifying a reordering algorithm based on the identified query type and the identified at least on index state for each partition; and performing the reordering of the data elements using the identified reordering algorithm.

7. The method of claim 5, and further comprising:

generating an output set for each of the partitions, thereby generating a plurality of output sets; and merging the plurality of output sets into a merged output set.

\* \* \* \* \*